US012732703B2

(12) United States Patent
Stimm et al.

(10) Patent No.: US 12,732,703 B2
(45) **Date of Patent: *Sep. 8, 2026**

(54) SYSTEMS AND METHODS FOR HORIZON LEVELING VIDEOS

(71) Applicant: GoPro, Inc., San Mateo, CA (US)

(72) Inventors: Daryl Stimm, Encinitas, CA (US); Kyler William Schwartz, Oceanside, CA (US); Jonathan Leland Thorn, San Leandro, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/454,062

(22) Filed: Jan. 20, 2026

(65) Prior Publication Data

US 2026/0149885 A1 May 28, 2026

Related U.S. Application Data

(63) Continuation of application No. 18/750,643, filed on Jun. 21, 2024, which is a continuation of application No. 17/744,949, filed on May 16, 2022, now Pat. No. 12,302,000, which is a continuation of application No. 17/006,536, filed on Aug. 28, 2020, now Pat. No. 11,336,832.

(60) Provisional application No. 62/894,649, filed on Aug. 30, 2019.

(51) Int. Cl.

| | |
|---|---|
| ***H04N 23/695*** | (2023.01) |
| ***G06T 3/40*** | (2024.01) |
| ***G06T 5/80*** | (2024.01) |
| ***H04N 23/53*** | (2023.01) |
| ***H04N 23/63*** | (2023.01) |

(52) U.S. Cl.

CPC ............. *H04N 23/695* (2023.01); *G06T 3/40* (2013.01); *G06T 5/80* (2024.01); *H04N 23/53* (2023.01); *H04N 23/632* (2023.01); *H04N 23/635* (2023.01)

(58) Field of Classification Search

CPC .. G06T 7/30; G06T 3/40; G06T 5/006; H04N 5/23218; H04N 5/23254; H04N 5/2327; H04N 5/23299; H04N 5/22525; H04N 5/232935; H04N 5/232945

See application file for complete search history.

(56) References Cited

U.S. PATENT DOCUMENTS

| | | | | |
|---|---|---|---|---|
| 2004/0257384 A1* | 12/2004 | Park | H04N 9/8047 348/E7.086 |
| 2005/0168583 A1* | 8/2005 | Thomason | H04N 5/2628 348/208.4 |
| 2015/0181123 A1* | 6/2015 | Pacurariu | H04N 25/443 348/208.2 |
| 2015/0215532 A1* | 7/2015 | Jafarzadeh | H04N 23/698 348/36 |

(Continued)

*Primary Examiner* — Nizar N Sivji

(74) *Attorney, Agent, or Firm* — Esplin & Associates, PC

(57) ABSTRACT

A video may be captured by an image capture device in motion. A horizon-leveled view of the video may be generated by providing a punchout of the video. The punchout of the video may compensate for rotation of the image capture device during capture of the video. The placement of the punchout of the video may be changed based on different rotational positions of to provide a view in which a horizon depicted within the video is leveled.

20 Claims, 9 Drawing Sheets

METHOD 200

201 Obtain video information defining a video, the video including video content captured by an image capture device during a capture duration, the video content having a progress length, the video content including visual content captured at different moments within the capture duration.

202 Obtain rotational position information of the image capture device, the rotational position information characterizing rotational positions of the image capture device as a function of progress through the capture duration 203 Determine a viewing window for the visual content as a function of progress through the progress length based on the rotational positions of the image capture device as the function of progress through the capture duration.

204 Generate horizon-leveled visual content based on the viewing window.

(56) References Cited

U.S. PATENT DOCUMENTS

| | | | | |
|---|---|---|---|---|
| 2015/0254871 | A1* | 9/2015 | MacMillan | H04N 21/233<br>382/180 |
| 2016/0088287 | A1* | 3/2016 | Sadi | H04N 13/117<br>348/43 |
| 2016/0283097 | A1* | 9/2016 | Voss | G06F 3/04847 |
| 2017/0118458 | A1* | 4/2017 | Grönholm | G02B 30/34 |
| 2017/0142337 | A1* | 5/2017 | Kokaram | H04N 23/683 |
| 2018/0160194 | A1* | 6/2018 | Bayliss | H04N 21/6543 |
| 2018/0302567 | A1* | 10/2018 | Watanabe | H04N 23/687 |
| 2019/0189160 | A1* | 6/2019 | Huang | H04N 23/60 |

* cited by examiner

SYSTEMS AND METHODS FOR HORIZON LEVELING VIDEOS

FIELD

This disclosure relates to horizon leveling videos based on a punchout of video frames.

BACKGROUND

A video may have been captured by an image capture device in motion. The motion of the image capture device during the capture of the video may cause the video to depict a tilted view of a scene.

SUMMARY

This disclosure relates to horizon leveling videos. Video information, rotational position information, and/or other information may be obtained. The video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view. The rotational position information may characterize rotational positions of the image capture device as a function of progress through the capture duration. A viewing window for the visual content as a function of progress through the progress length may be determined based on the rotational positions of the image capture device as the function of progress through the capture duration and/or other information. The viewing window may define extents of the visual content to be included within horizon-leveled visual content as the function of progress through the progress length. Determination of the viewing window may include determination of a placement of the viewing window within the field of view of the visual content as the function of progress through the progress length based on the rotational positions of the image capture device as the function of progress through the capture duration and/or other information. The horizon-leveled visual content may be generated based on the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content.

A system that horizon levels videos may include one or more electronic storages, one or more processors, and/or other components. An electronic storage may store video information defining a video, information relating to the video, information relating to video content, information relating to visual content, information relating to an image capture device, information relating to a capture duration, rotational position information for the video, information relating to rotational positions of the image capture device, information relating to a viewing window, information relating to placements of the viewing window, information relating to horizon-leveled visual content, information relating to a punchout of visual content, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate horizon leveling videos. The machine-readable instructions may include one or more computer program components. The computer program components may include one or more of a video information component, a position information component, a viewing window component, a generation component, and/or other computer program components.

The video information component may be configured to obtain video information and/or other information. Video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view.

In some implementations, the visual content may include a distortion such that a straight line within a scene depicted within the visual content appears as a curved line. The distortion of the visual content may reduce impact of an off-axis horizon depicted within the horizon-leveled visual content. In some implementations, the distortion may include a barrel distortion, a pincushion distortion, and/or other distortions.

In some implementations, the visual content may include the distortion based on capture of the visual content through a wide field of view optical element. In some implementations, the visual content may include the distortion based on application of the distortion to non-distorted visual content. The distortion may be applied to the non-distorted visual content based on the visual content including the non-distorted visual content and/or other information.

The position information component may be configured to obtain rotational position information for the video and/or other information. The rotational position information may characterize rotational positions of the image capture device that captured the video content as a function of progress through the capture duration.

The viewing window component may be configured to determine a viewing window for the visual content as a function of progress through the progress length based on the rotational positions of the image capture device as the function of progress through the capture duration and/or other information. The viewing window may define extents of the visual content to be included within horizon-leveled visual content as the function of progress through the progress length. Determination of the viewing window may include determination of a placement of the viewing window within the field of view of the visual content as the function of progress through the progress length based on the rotational positions of the image capture device as the function of progress through the capture duration and/or other information.

In some implementations, the determination of the placement of the viewing window within the field of view of the visual content may include determination of a rotation of the viewing window within the field of view of the visual content.

In some implementations, the determination of the viewing window may include determination of a size of the viewing window as the function of progress through the progress length based on the rotational positions of the image capture device as the function of progress through the capture duration. In some implementations, the size of the viewing window may change as the function of progress through the progress length to simulate changes in zoom for the visual content.

In some implementations, the viewing window may have a one-by-one aspect ratio. The one-by-one aspect ratio of the viewing window may reduce impact of an off-axis horizon depicted within the horizon-leveled visual content.

In some implementations, the determination of the placement of the viewing window within the field of view of the visual content may include determination of a location of the viewing window within the field of view of the visual content. The location of the viewing window within the field of view of the visual content may determine framing of the visual content.

The generation component may be configured to generate the horizon-leveled visual content based on the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content. In some implementations, the horizon-leveled visual content may be generated as a director track that defines the extents of the visual content to be used during playback to provide a horizon-leveled view of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
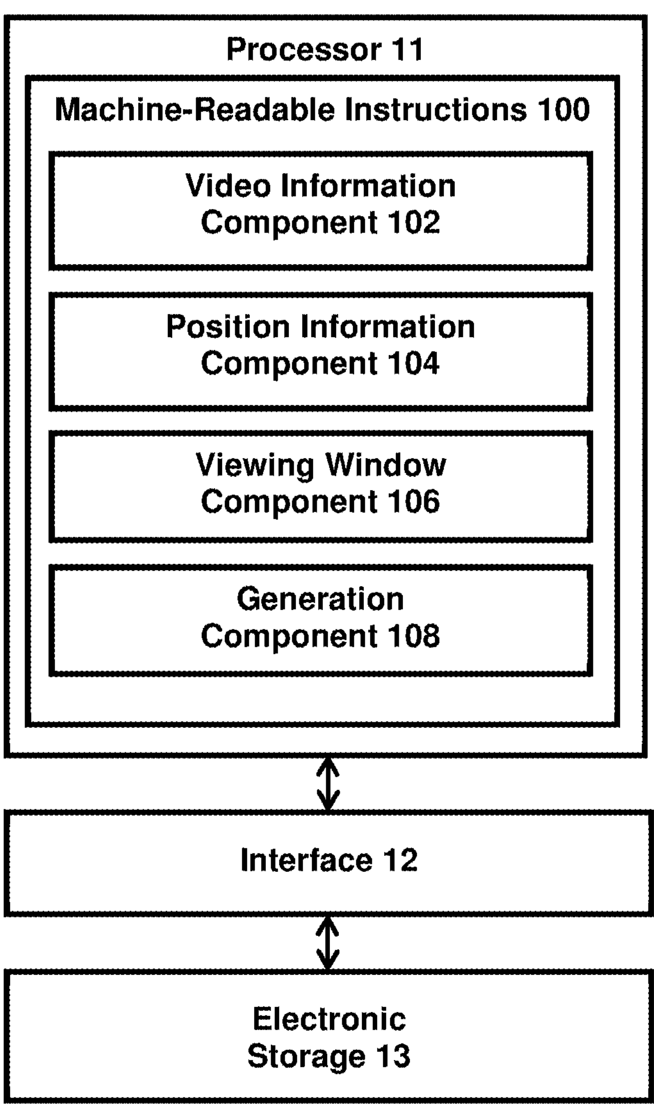
FIG. 1 illustrates an example system that horizon levels videos.

FIG. 1 illustrates a system 10 for horizon leveling videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information, rotational position information, and/or other information may be obtained by the processor 11. The video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view. The rotational position information may characterize rotational positions of the image capture device as a function of progress through the capture duration.

A viewing window for the visual content as a function of progress through the progress length may be determined by the processor 11 based on the rotational positions of the image capture device as the function of progress through the capture duration and/or other information. The viewing window may define extents of the visual content to be included within horizon-leveled visual content as the function of progress through the progress length. Determination of the viewing window may include determination of a placement of the viewing window within the field of view of the visual content as the function of progress through the progress length based on the rotational positions of the image capture device as the function of progress through the capture duration and/or other information. The horizon-leveled visual content may be generated by the processor 11 based on the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining a video, information relating to the video, information relating to video content, information relating to visual content, information relating to an image capture device, information relating to a capture duration, rotational position information for the video, information relating to rotational positions of the image capture device, information relating to a viewing window, information relating to placements of the viewing window, information relating to horizon-leveled visual content, information relating to a punchout of visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate horizon leveling videos. The machine-readable instructions 100 may include one or more computer program components. The machine-readable instructions 100 may include one or more of a video information component 102, a position information component 104, a viewing window component 106, a generation component 108, and/or other computer program components.

Visual content may refer to content of image(s), video frame(s), and/or video(s) that may be consumed visually. For example, visual content may be included within one or more images and/or one or more video frames of a video. The video frame(s) may define the visual content of the video. That is, video may include video frame(s) that define the visual content of the video. Video frame(s) may define visual content viewable as a function of progress through the progress length of the video content. A video frame may include an image of the video content at a moment within the progress length of the video.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
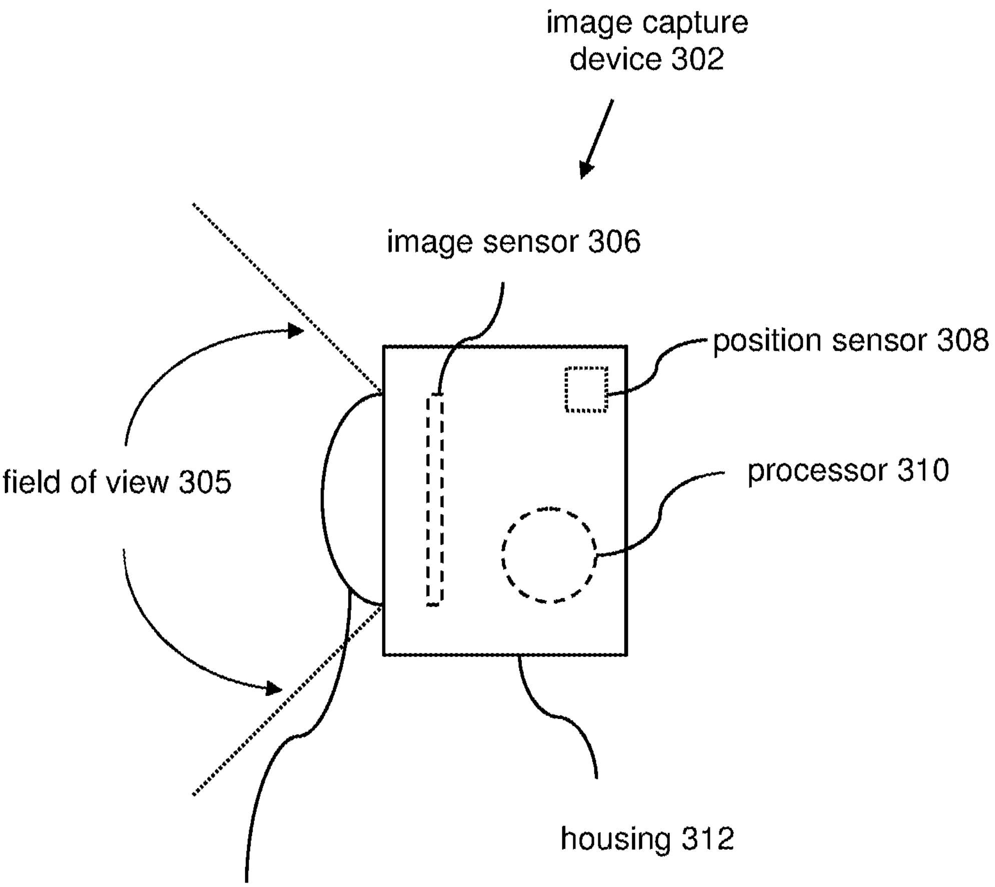
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The field of view 305 may be larger than a size of the punchout/viewing window used to generate horizon-leveled visual content. Horizon-leveled visual content may refer to visual content depicting a leveled scene. Horizon-leveled visual content may refer to visual content including depiction of a scene that is leveled with respect to ground, sea, earth, and/or the horizon. A horizon may refer to a line that appears to separate the visual content into two portions. A horizon may extend across majority or entirety of the visual content. For example, a horizon may refer to a line where the earth (e.g., ground, sea) appears to meet the sky. Horizon-leveled visual content may refer to visual content that depicts a scene which appears to have been captured by an upright image capture device (non-tilted image capture device).

Portions of the visual content captured from light within the field of view 305 may be presented on a display and/or used to generate a video. The portions of the visual content presented on the display/used to generate a video may include those portions of the visual content defined by (e.g., within) a viewing window. A viewing window may define extents of the visual content (e.g., of image(s)/video frame(s)) to be included within a punchout. The viewing window may be determined so that the visual content within the presentation/generated video appears to be leveled with respect to horizon. For example, the placement (rotation, location, shape, and/or size) of the viewing window within the field of view of the visual content may be determined to compensate for rotation (e.g., tilt) of the image capture device 302 during capture such that the video appears to have been captured from an image capture device 302 with less rotation. That is, the visual content captured by the image capture device 302 may be cropped to generate horizon-leveled visual content.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, one or more magnetometers, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration.

The position information may characterize and/or be used to determine the tilt of the image capture device 302. Tilt of the image capture device 302 may refer to the extent to which image capture device 302 is in a sloping position. Tilt of the image capture device 302 may include rotation of the image capture device about its roll axis and/or other axes. For example, the position information may include the direction of gravity on the image capture device 302 when visual content is captured at different moments within the capture duration, information on the amount of angle by which the image capture device 302 is tilted with respect to horizon, and/or other information that characterizes and/or may be used to determine the tilt of the image capture device 302.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may use the position information to horizon level visual content captured through the optical element 304 and/or the image sensor 306. Horizon leveling of visual content may refer to modifying or punching out a portion of the visual content to depict a leveled scene. Horizon leveling of visual content may refer to modifying or punching out a portion of the visual content so that the scene depicted within the visual content is leveled with respect to ground, sea, earth, and/or the horizon. Horizon leveling of visual content may refer to modifying or punching out a portion of the visual content so that the depicted scene appears to have been captured by an upright image capture device (non-tilted image capture device).

Visual content having a field of view may be captured by the image capture device 302 during a capture duration. The processor 310 may determine the rotational positions of the image capture device 302 as a function of progress through the capture duration and use the rotational positions of the image capture device 302 to determine placement of the viewing window within the field of view of the visual content. The placement of the viewing window within the field of view of the visual content may be defined by one or more of the rotation of the viewing window, the location of the viewing window within the field of view, the shape of the viewing window, and/or the size of the viewing window. The visual content defined by the viewing window may be used (e.g., cropped) to generate horizon-leveled visual content.

For example, the rotation of the viewing window may be changed as a function of progress through the progress length of the visual content based on the rotational positions of the image capture device as a function of progress through the capture duration to compensate for the rotation (tilt) of the image capture device during capture duration. Different rotational extents of the visual content may be cropped to horizon-level the visual content. The size of the viewing window may be increased and/or decreased as a function of progress through the progress length of the visual content based on the rotational positions of the image capture device as a function of progress through the capture duration and different sizes of extents of the visual content may be cropped to horizon-level the visual content.

Horizon leveling of visual content may be performed based on placement of the viewing window within the field of view of the visual content. The placement of the viewing window may compensate for the rotation (tilt) of the image capture device during the capture duration. For example, a viewing window having a smaller size than the field of view of the visual content may be used to provide a punchout of the visual content. The punchout (cropped view) may be rotated within the field of view to provide a horizon-leveled view of the visual content.

Figure 4A:
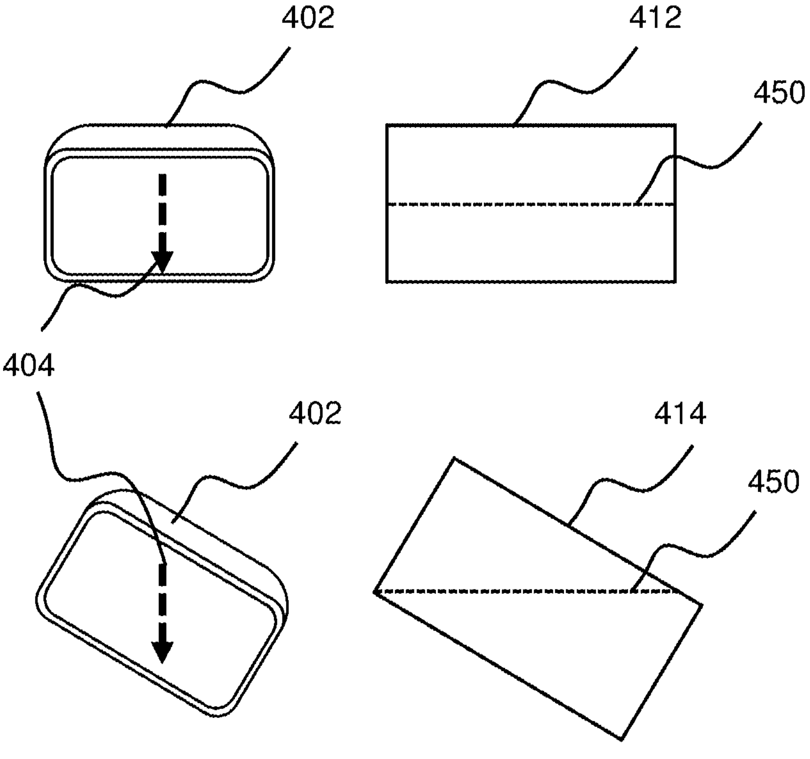
FIGS. 4A and 4B illustrate example images captured by an image capture device from different rotational positions.
Figure 4B:
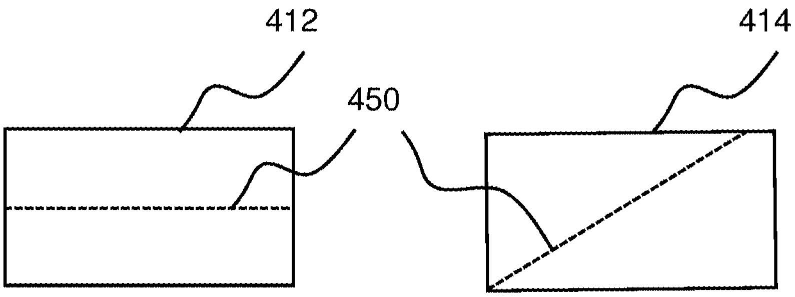

FIG. 4A illustrates example images 412, 414 captured by an image capture device 402 from different rotational positions. Gravity direction on the image capture device 402 during capture of the images 412, 414 is shown by an arrow 404. The image 412 may be captured by the image capture device 402 while the image capture device 402 is leveled with respect to ground. The image 412 may include visual content depicting a leveled scene within the field of view of the image capture device 402. For example, the image 412 may include visual content depicting a horizon 450 that is leveled. The image 414 may be captured by the image capture device 402 while the image capture device 402 is rotated to the right. Tilt of the image capture device 402 may cause the visual content captured by the image capture device 402 to depict a non-leveled scene. The image 414 may include visual content depicting a tilted scene within the field of view of the image capture device 402. For example, the image 414 may include visual content depicting a horizon 450 that is tilted. FIG. 4B illustrates how the images 412, 414 may be shown on a display. As shown in FIG. 4B, capture of the image 414 by the image capture device 404 in a tilted position may result in the horizon 450 not being leveled within a presentation of the image 414.

The visual content captured by the image capture device may be leveled as the function of progress through the progress length based on the rotational positions of the image capture device as the function of progress through the capture duration and/or other information. That is, the visual content captured by the image captured device may be rotated to compensate for rotation of the image capture device during the capture duration such that a view of the visual content includes depiction of leveled scene. For example, readings from the position sensor may be used to determine the direction of gravity when visual content is captured at different moments within the capture duration. The direction of gravity may be used to determine the amount of rotation that needs to be applied to the visual content to level the depiction within the visual content. For example, the visual content may be rotated so that the direction of gravity is pointed downwards.

Figure 5A:
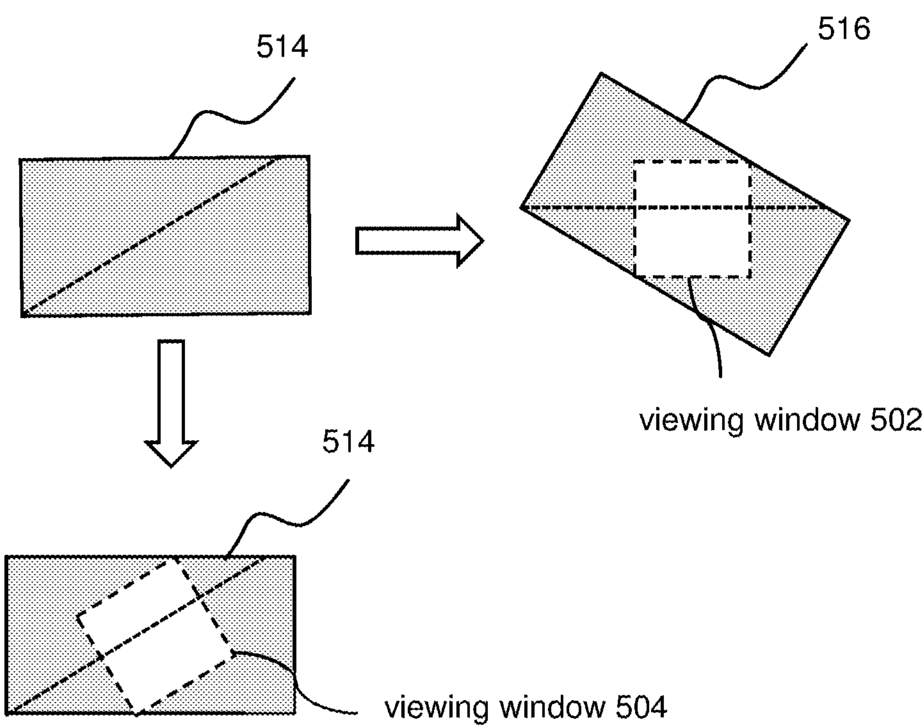
FIG. 5A illustrates example horizon leveling of an image.

The rotation of the visual content may be effectuated through rotation of the visual content itself and/or through orientation of the viewing window with respect to the field of view of the visual content. For example, FIG. 5A illustrates example horizon leveling of an image 514. The image 514 may be captured by an image capture device that is rotated to the right with respect to ground. For example, the image 514 may be captured by the image capture device 402 rotated to the right to capture the image 414 (shown in FIG. 4A). Such rotation of the image capture device may result in the visual content including tilted depiction of the scene. Viewing the image 514 may show upright objects within the scene to be depicted as being tilted to the left. The visual content of the image 514 may be rotated based on the rotational position of the image capture device during capture of the image 514 to provide horizon-leveled view of the scene. For example, the visual content of the image 514 may be rotated to the right to generate a leveled image 516. The leveled image 514 may be leveled with respect to horizon and upright objects within the scene may appear as being upright. A viewing window 502 may be positioned in an upright manner within the visual content of the leveled image 516 to provide an upright punchout (leveled view) of the scene. As another example, a viewing window 504 may be placed within unleveled visual content of the image 514. The viewing window 504 may be placed in a tilted manner within the unleveled visual content of the image 514 to provide an upright punchout (leveled view) of the scene.

Such automatic horizon leveling of the visual content based on image capture device position information may eliminate the need to manually level images post capture and/or the need to level the image capture device during visual content capture. For instance, rather than requiring a user to manually edit images after capture to horizon level the visual content, the visual content may be automatically horizon leveled based on the position (e.g., rotation) of the image capture device during capture. Such automatic horizon leveling of the visual content may enable a user to "capture" horizon-level visual content with image capture devices without a viewfinder and/or a display showing a preview of visual content to be captured. An image capture device without a viewfinder and/or a display for image composition may be used (e.g., held, mounted) without regard for leveling the camera and still generate stabilized visual content. That is, the image capture device may lack a view finder and/or a display for image composition, and the horizon leveling of the visual content may be performed based on the position (e.g., rotation) of the image capture device. Such automatic horizon leveling may be used to horizon level visual content where achieving a leveled state for the image capture device may be impractical (e.g., horizon leveling for images captured by an aerial imaging device).

The size of the viewing window (punchout) may be determined (e.g., dynamically changed) based on the rotational positions of the image capture device. For example, rotation (e.g., tilt) of the visual content may be estimated based on readings from the position sensor of the image capture device. The rotational positions of the image capture device as the function of progress through the capture duration may be used to determine/estimate the offset of the visual content from horizon due to rotation of the image capture device. The size of the viewing window may be changed (e.g., increased, decreased) based on the amount of rotation. The size of the viewing window may be changed to take advantage of different amounts of the visual content that may be presented within a horizon-leveled of the visual content based on different amounts of rotation of the image capture device.

For example, rotation of the image capture device from being horizontally/vertically held to being tilted by 45 degrees from horizon may result in the size of the viewing window being decreased. Rotation of the image capture device from being tilted by 45 degrees from horizon to being horizontally/vertically held result in the size of the viewing window being increased. Such dynamic change in the size of the viewing window may enable generation of horizon-leveled visual content that includes greater extent of the original visual than if a fixed-sized viewing window is used. The horizon-leveled visual content may include different extents of the original visual content based on the rotation of the image capture device during the capture duration. The size of the viewing window may be expressed in terms of field of view (field of view of visual content versus field of view of the viewing window), in terms of megapixels (megapixel of the visual content versus megapixel of the viewing window), and/or in other terms.

Figure 5B:
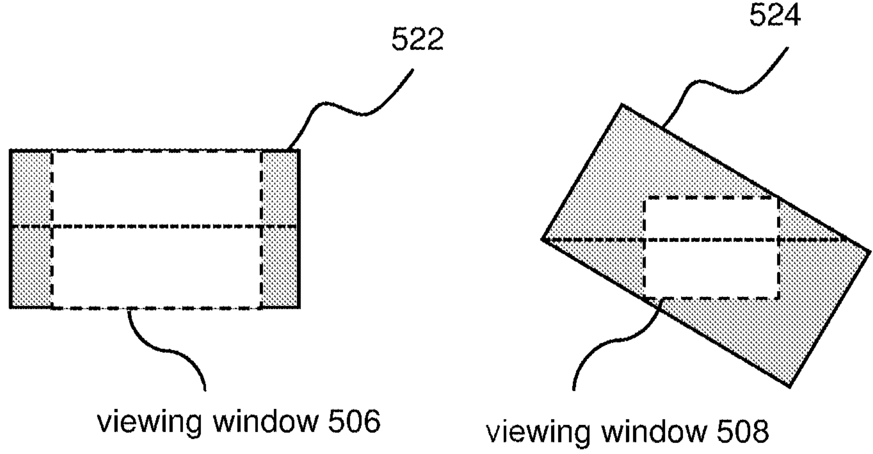
FIG. 5B illustrates example viewing windows to provide horizon-leveled views of images.

FIG. 5B illustrates example viewing windows 506, 508 to provide horizon-leveled views of images 522, 524. The image 522 may be captured by an image capture device that is leveled with respect to ground. The visual content of the image 522 may include a leveled depiction of a scene. A viewing window 506 may be placed within the field of view of the visual content of the image 522 to provide a leveled view of the scene. The image 524 may be captured by the image capture device that is rotated with respect to ground. The visual content of the image 524 may include a tilted depiction of a scene. A viewing window 508 may be placed within the field of view of the visual content of the image 524 to provide a leveled view of the scene.

Different amounts of rotation of the image capture device during capture of the images 522, 524 may result in different sizes of the viewing windows 506, 508. The viewing windows 506, 508 may have a four-by-three aspect ratio (4:3). The viewing windows 506, 508 may have the maximum size that may be used within the images 522, 524, to provide a leveled view of the scene. Using a larger viewing window may result in the visual content not including sufficient information (e.g., pixels) to properly fill the view (e.g., fill the display screen).

The viewing window 506 may have a larger size (larger viewing size) than the viewing window 508. The image 522 being captured by the image capture device leveled with respect to ground may enable the larger viewing size of the viewing window 506. The image 524 being captured by the image capture device rotated with respect to ground may result in the smaller viewing size of the viewing window 508. Thus, the rotation of the image capture device during visual content capture may determine/change the maximum size of the viewing window that may be used to provide a leveled view of the scene captured within the visual content. Changes in the viewing size (sizes of the viewing window) between different images may simulate changes in zoom of the visual content.

In some implementations, the changes in the maximum size of the viewing window (that may be used to horizon level visual content) based on rotation of the image capture device may be used to change the zoom level of the image capture device used to capture visual content. Use of buttons, switches, dials, and/or other features of the image capture device that needs to be engaged to change the zoom level of the image capture device may interfere with visual content capture. For example, a user engaging a button, a switch, and/or a dial to control the zoom level may take the user's attention away from the visual content being captured and/or may adversely impact the positioning of the image capture device (e.g., cause the image capture device to shake). Requiring such interaction by the user with the image capture device may take time. For example, when a user wishes to zoom-in and/or zoom-out, the user may need to locate the corresponding zoom button/switch/dial and engage the zoom button/switch/dial to change the zoom level.

Rather than requiring such interaction by the user with the image capture device, the zoom level of the image capture device may be changed based on rotation of the image capture device. For example, the zoom-level of the image capture device may correspond to the maximum size of the viewing window that may be used to stabilized visual content capture by the image capture device. The image capture device may monitor the rotational positions of the image capture device during capture to determine the zoom level of the visual content capture. When the image capture device is rotated away from being horizontally/vertically held towards being tilted by 45 degrees from horizon, the zoom level of the image capture device may be increased (e.g., larger than 1×) with the extent of the visual content that is captured including and/or being smaller than the maximum size of the viewing window allowed based on the image capture device rotation. When the image capture device is rotated away from being tilted by 45 degrees from horizon, the zoom level of the image capture device may be decreased (e.g., towards 1×) with the extent of the visual content that is captured including and/or being smaller than the maximum size of the viewing window allowed based on the image capture device rotation.

For example, referring to FIG. 5B, the image capture device may be used to capture a video (visual content of video frames). The capture of the video may start with the image capture device leveled to capture the image 522 (initial video frame). During the capture of the video, the image capture device may be rotated to capture the image 524 (subsequent video frame). The rotation of the image capture device from being leveled to being tilted may cause the zoom level of the image capture device to be increased (with the extent of the visual content that is captured including and/or being smaller than the maximum size of the viewing window allowed based on the rotation of the image capture device). The rotation of the image capture device back to being leveled may cause the zoom level of the image capture device to be decreased.

Changing the zoom level of the image capture device based on the rotation of the image capture device may allow the user to capture visual content with different zoom levels without interfering with the visual content capture (e.g., not having to take a hand/fingers away from holding the image capture device to operate the zoom button). Such changing of the zoom level may allow the user to change zoom level by changing how the image capture device is being held. Such changing of the zoom level may allow the user to change zoom level by simply rotating the image capture device and may not require the user to have to find and/or engaged with zoom button/switch/dial to change the zoom level.

In some implementations, a viewing window with a fixed viewing size may be used to provide a leveled view of scene depicted within the visual content. Using a viewing window with a fixed viewing size may enable generation of images/videos that appears to have been captured using the same zoom level. For example, using a viewing window with a fixed viewing size for a video may not simulate changes in zoom.

Figure 5C:
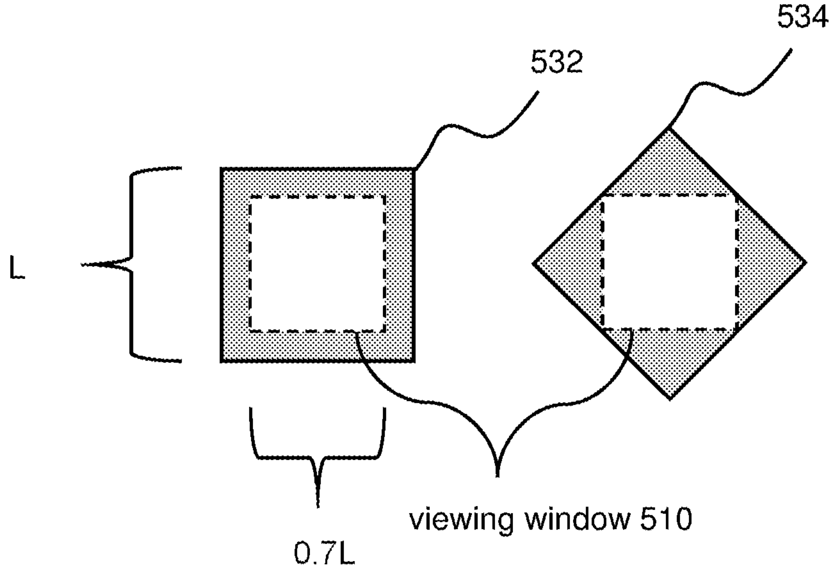
FIG. 5C illustrates an example viewing window to provide horizon-leveled views of images.

FIG. 5C illustrates an example viewing window 510 to provide horizon-leveled views of images 532, 534. The image 532 may be captured by an image capture device that is leveled with respect to ground. The visual content of the image 532 may include a leveled depiction of a scene. The viewing window 510 may be placed within the field of view of the visual content of the image 532 to provide a leveled view of the scene. The image 534 may be captured by the image capture device that is rotated with respect to ground. The visual content of the image 534 may include a tilted depiction of a scene. The viewing window 510 may be placed within the field of view of the visual content of the image 534 to provide a leveled view of the scene.

Different amounts of rotation of the image capture device during capture of the images 522, 524 may not result in different sizes of the viewing window 510. Rather, the viewing window 510 may have a fixed size that is able to provide a leveled view of the visual content regardless of the rotation of the age capture device during capture of the images 522, 524. For example, the images 522, 524 may have a square shape (one-by-one aspect ratio) with individual sides have length L. The viewing window 510 may have a square shape with individual sides have length 0.7L. Using a viewing window with fixed size between different images may simulate the zoom of the visual content remaining constant. Other sizes, aspect ratios, and dimensions of viewing windows are contemplated.

Referring back to FIG. 1, the processor 11 (or one or more components of the processor 11) may be configured to obtain information to facilitate horizon leveling videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The video information component 102 may be configured to obtain video information and/or other information. The video information may define a video. The video information may define a video by including information that defines one or more content, qualities, attributes, features, and/or other aspects of the video. For example, video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. For example, the video information may include information that makes up and/or is used to determine pixels of video frames of the video. Other types of video information are contemplated.

The video information component 102 may obtain video information defining a video while the video is being captured by an image capture device. The video information component 102 may obtain video information defining a video after the video has been captured and stored in memory (e.g., the electronic storage 13).

In some implementations, the video information component 102 may obtain video information based on user interaction with a user interface/application (e.g., video editing application, video player application), and/or other information. For example, a user interface/application may provide option(s) for a user to select one or more videos that are to be horizon-leveled and/or played. The video information defining the video may be obtained based on the user's selection of the video content through the user interface/video application. Other selections of video are contemplated.

The video may include video content captured by an image capture device during a capture duration. The video content may have a progress length. The progress length of the video content may correspond to the capture duration. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

The video content may include visual content captured at different moments within the capture duration. The visual content may be viewable as a function of progress through the progress length. The visual content may have a field of view, such as the field of view 305 shown in FIG. 3. The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames).

The position information component 104 may be configured to obtain rotational position information for the video and/or other information. The rotational position information may characterize rotational positions of the image capture device that captured the video/video content as a function of progress through the capture duration for the video/video content. The rotational position information may describe and/or define the rotational positions of the image capture device at different moments within the capture duration and/or changes in rotational positions (motion) of the image capture device at different moments within the capture duration. For example, the rotational position information may characterize and/or be used to determine the tilt of the image capture device that captured the video/video content. For instance, the rotational position information may include the direction of gravity on the image capture device at different moments within the capture duration, information on the amount of angle by which the image capture device is tilted with respect to horizon, and/or other information that characterizes and/or may be used to determine the tilt of the image capture device.

The position information component 104 may obtain rotational position information for the video while the video is being captured by the image capture device. The position information component 104 may obtain rotational position information for the video during generation of the position output signal by the position sensor. The position information component 104 may obtain rotational position information for the video after the video/position information has been captured and stored in memory (e.g., the electronic storage 13). In some implementations, the position information component 104 may be configured to obtain other position information (e.g., translational position information).

The viewing window component 106 may be configured to determine a viewing window for the visual content as a function of progress through the progress length. One or more of rotation, location, shape, size, and/or other characteristics of the viewing window may be determined for different moments within the progress length of the visual content. The viewing window may be determined based on the rotational positions of the image capture device as the function of progress through the capture duration and/or other information. One or more of rotation, location, shape, size, and/or other characteristics of the viewing window may be determined for different moments within the progress length of the visual content based on the rotational positions of the image capture device during corresponding moments within the capture duration and/or other information.

A viewing window may be characterized by viewing directions, viewing sizes (e.g., viewing zoom, viewing magnification), viewing rotations, and/or other information. A viewing direction may define a direction of view for visual content. A viewing direction may define the angle/visual portion of the visual content at which the viewing window may be directed. A viewing direction may define the location of the viewing window within the field of view of the visual content. Changes in the viewing direction as the function of progress through the progress length may effectuate movement (e.g., panning) of the viewing window within the field of view of the visual content.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio). Changes in the viewing size (sizes of the viewing window) as the function of progress through the progress length may simulate changes in zoom of the visual content. The viewing size may be increased to simulate decrease in zoom of the visual content. The viewing size may be decreased to simulate increase in zoom of the visual content.

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content. The rotation of the viewing window may compensate for rotation of the image capture device during capture duration.

A viewing window may define one or more extents of the visual content. A viewing window may define extents of the visual content to be included within horizon-leveled visual content as the function of progress through the progress length. A viewing window may define which portions of the visual content are included within the horizon-leveled visual content at different moment within the progress length. Inclusion of the extents of the visual content defined by the viewing window within the horizon-leveled visual content may effectuate horizon leveling of the visual content.

A viewing window may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length. A viewing window may correspond to the entire progress length or for one or more portions (e.g., portions including moments of interest) of the progress length. The punchout of the visual content may be presented on one or more displays, included in one or more videos, and/or otherwise used for presenting horizon-leveled view of the visual content.

For example, determination of the viewing window may include determination of a placement of the viewing window within the field of view of the visual content as the function of progress through the progress length based on the rotational positions of the image capture device as the function of progress through the capture duration and/or other information. The placement of the viewing window may refer to how the viewing window is positioned within the field of view of the visual content. The placement of the viewing window may be determined by one or more of rotation, location, shape, size, and/or other characteristics of the viewing window. For example, the placement of the viewing window may be determined as described above with respect to FIGS. 5A-5C.

In some implementations, the determination of the placement of the viewing window within the field of view of the visual content may include determination of a rotation of the viewing window within the field of view of the visual content. The rotation of the viewing window within the field of view of the visual content may be determined as a function of progress through the progress length based on the rotational positions of the image capture device as the function of progress through the capture duration and/or other information. For example, the visual content may be rotated to level the visual content as the function of progress through the progress length based on the rotational positions of the image capture device as the function of progress through the capture duration and/or other information. Rotation of the visual content may be determined for different moments within the progress length of the visual content. The visual content may be rotated to compensate for rotation of the image capture device during the capture duration such that a view of the visual content includes depiction of leveled scene. The rotation of the visual content may be effectuated through rotation of the visual content itself and/or through orientation of the viewing window with respect to the field of view of the visual content. For example, the visual content may be rotated to level the visual content as described above with respect to FIGS. 5A-5C.

The amount and the direction by which the visual content is rotated may be inverse of the amount and the direction by which the rotational position of the image capture device is offset from being leveled. For example, based on the image capture device being tilted to the right by 30 degrees during capture of the visual content, the visual content may be rotated to the left by 30 degrees. In some implementations, the direction of gravity for visual content capture at different moments may be used to determine the amount and direction of rotation that needs to be applied to the visual content to level the depiction within the visual content. For example, the visual content may be rotated so that the direction of gravity is pointed downwards.

In some implementations, the rotation of the visual content may take into account visual analysis of the visual content. For example, the object detection, such as through machine-learning image analysis, may be used to detect horizon within an image and the visual content of the image may be rotated to level the detected horizon within the image. As another example, the image capture device rotation may be used to perform an initial horizon leveling of the image and the visual analysis may be used to improve the horizon leveling of the image. The initial horizon leveling of the image via the image capture device rotation may facilitate use of visual analysis to detect horizon within the image. For instance, the image may have been captured with multiple lines that may be interpreted as horizon within the image. The lines may have different slopes within the image. The initial horizon leveling of the image via the image capture device rotation may decreasing the slope of the line representing the horizon while increasing the slope of line(s) representing other things within the image. Such initial horizon leveling of the image may make it easier to detect the actual horizon within the image and/or reduce false detection of horizon within the image.

In some implementations, the rotation of the visual content make take into account other rotations performed on the visual content. For instance, electronic image stabilization may be performed to remove unwanted movement (e.g., shakiness) in the images. Electronic image stabilization may perform one or more rotations of the visual content to remove unwanted rotation in the images. The rotation of the visual content to perform horizon leveling may take into account the rotation(s) performed by the electronic image stabilization in addition to the rotation of the image capture device to level the images. The rotation of the visual content to perform horizon leveling may be incorporated with the electronic image stabilization so that rotation of the visual content to remove unwanted rotation and to increase horizon leveling in the images are performed together.

In some implementations, the determination of the viewing window may include determination of the size of the viewing window (viewing size). The size of the viewing window may be determined as the function of progress through the progress length based on the rotational positions of the image capture device as the function of progress through the capture duration and/or other information. The size of the viewing window may be determined for different moments within the progress length of the visual content. The size of the viewing window may be determined to take into account the maximum size of the viewing window allowed based on the image capture device rotation. The size of the viewing window may be determined to be the same or smaller than the maximum size of the viewing window allowed based on the image capture device rotation. In some implementations, the size of the viewing window may change as the function of progress through the progress length to simulate changes in zoom for the visual content. For example, the size of the viewing window may be determined as described above with respect to FIGS. 5B-5C.

Figure 6A:
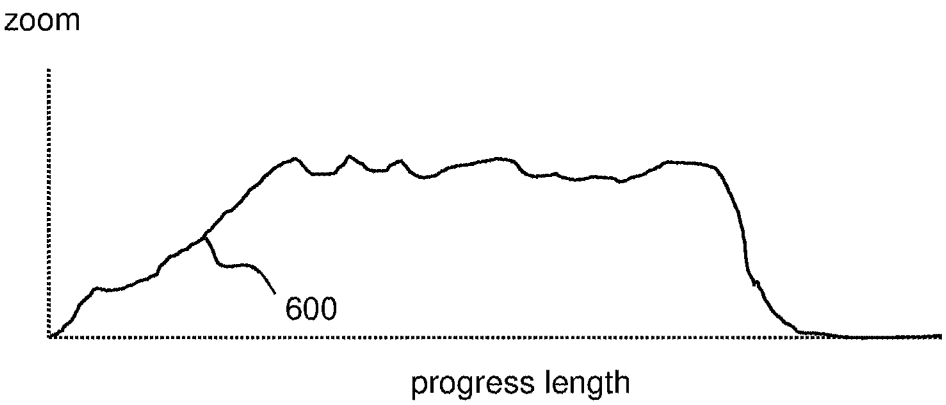
FIGS. 6A-6C illustrate example zoom curves.

In some implementations, the viewing window may be determined to have the maximum size of the viewing window allowed based on the image capture device rotation as the function of progress through the progress length. That is, the viewing window may have the maximum sizes that are determined based on the rotational positions of the image capture device at different moments during the capture duration. For example, FIG. 6A illustrates an example zoom curve 600. The zoom curve 600 may include values as a function of the progress length, where the values reflect the amount of minimum zoom of the visual content (maximum size of the viewing window) that includes sufficient information to provide a leveled view of captured scene (e.g., not include missing pixels within the viewing window. The values of the zoom curve 600 may reflect the maximum size of the viewing window that may be used with the viewing window not extending beyond the field of view of the visual content.

The lowest zoom may correspond to no zooming of the visual content (1× zoom). For example, the entirety of the captured visual content and/or cropped visual content that extends across at least one dimension of the visual content may be included within the horizon-leveled visual content. Higher zooming of the visual content may result in smaller spatial portions of the captured visual content being included within the horizon-leveled visual content. The size of the viewing window may increase with decrease in zoom. The size of the viewing window may decrease with increase in zoom. Using the zoom values of the zoom curve may result in pronounced (e.g., rapid, jittery) changes in zoom/viewing window size within the horizon-leveled visual content. The zoom effect may be very pronounced within the horizon-leveled visual content if the visual content was captured by an image capture device undergoing jittery/rapid rotations.

Figure 6B:
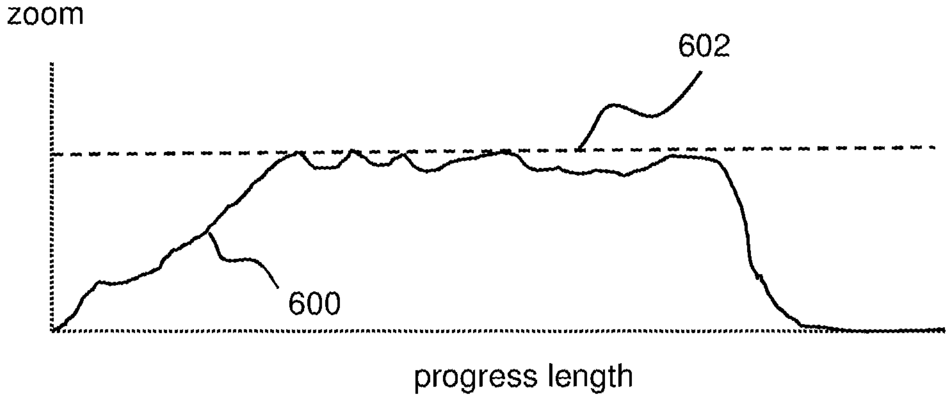

In some implementations, the viewing window may be determined to have a minimum of the maximum sizes of the viewing window allowed over the progress length. That is, the viewing window may have the smallest of the maximum viewing window size that are determined over the progress length based on the rotational positions of the image capture device at different moments during the capture duration. For example, FIG. 6B illustrates an example maximum zoom curve 602. The maximum zoom curve 602 may include a single value over the progress length, where the single value reflects the maximum cropping size of the visual content that allows horizon leveling of the visual content over the entire progress length with the viewing window not extending beyond the field of view of the visual content. The value of the maximum zoom curve 602 may be equal to or greater than the maximum value of the zoom curve 600. Using a single size of the viewing window over the progress length may result in the horizon-leveled visual content not including zooming effects. Such a determination of the viewing size may be beneficial for visual content captured by an image capture device with frequent instances of rotation (e.g., video captured while spinning in the air, video captured by an image capture device inside a spinning ball). However, high quality visual content (high resolution image) may need to be captured by the image capture device to provide a pleasant punchout with a small viewing window size (narrow field of view). Moreover, visual content may be cropped more than needed to provide horizon leveling.

In some implementations, the viewing window may be determined to have smoothed changes in the maximum size of the viewing window allowed as the function of progress through the progress length. That is, the maximum sizes of the viewing window allowed based on the image capture device rotation may be smoothed to determine the sizes of the viewing window used for horizon leveling. Smoothing of the changes in the maximum sizes as the function of progress through the progress length may include removing high frequencies changes in the maximum sizes. Smoothing of the changes in the maximum sizes may enable horizon leveling that eases in and out of different sizes of viewing window by anticipating upcoming changes in the maximum sizes. Rather than simulating a constant zoom or a zoom with pronounced (e.g., rapid. Jittery) changes, the smoothing of the changes in the maximum sizes may simulate smoothed/gradual changes in zoom.

In some implementations, smoothing of the changes in the maximum sizes as the function of progress through the progress length may include insertion of one or more ramping changes in maximum sizes. For example, based on the changes in maximum sizes including jittery increase in size over a portion of the progress length, the jittery increase in size may be replaced with a smooth ramp that increases in size. Based on the changes in maximum sizes including jittery decrease in size over a portion of the progress length, the jittery decrease in size may be replaced with a smooth ramp that decreases in size.

Figure 6C:
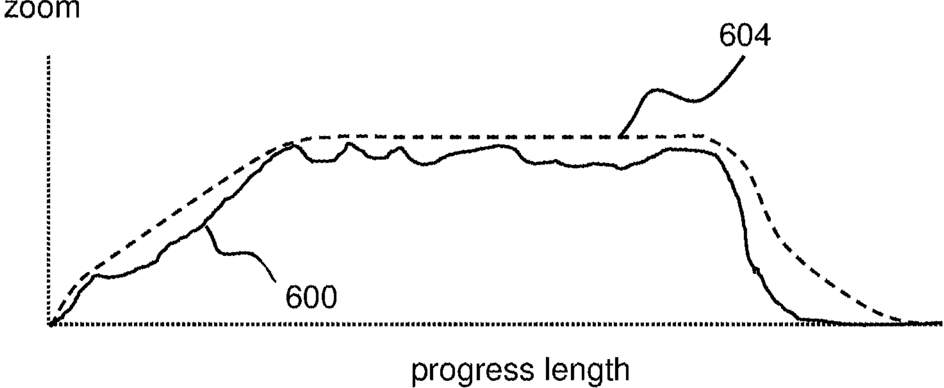

For example, FIG. 6C illustrates an example smoothed zoom curve 604. The smoothed zoom curve 604 may smoother changes in zoom than the zoom curve 600. The value of the smoothed zoom curve 604 may be equal to and/or greater than the maximum value of the zoom curve 600. Using a smoothed zoom curve may allow for rapid changes in zoom to be replaced with smoothed zooms, creating a more cinematic feel to the horizon-leveled video than use of the zoom curve 600. Smoothing of the zoom curve 600 may include analysis of the changes in the sizes of the viewing window as defined by the zoom curve 600. Based on the analysis, the viewing window may be artificially made smaller and/or larger (e.g., artificially zoom-in and/or zoom-out) during moments that do not require the change in viewing window size to ramp-up and/or ramp-down to the needed viewing window size.

Use of different zoom curves may enable generation of horizon-leveled visual content with different styles of zoom. For example, horizon-leveled visual content with smoothed/dampened style of zoom may be generated based on use of a smooth zoom curve (e.g., the smoothed zoom curve 604). Horizon-leveled visual content with maximum zoom/no change in zoom style may be generated based on use of a maximum zoom curve (e.g., the maximum zoom curve 602). Horizon-leveled visual content with zoom that follows the rotation of the image capture device may be generated based on the use of a non-modified zoom curve (the zoom curve 600).

Use of different zoom curves/styles may be selected by the user and/or automatically selected. For example, a particular zoom curve/style may be selected for use in generating horizon-leveled visual content based on user interaction with a user interface/application (e.g., video editing application, video player application), and/or other information. For instance, a user interface/application may provide option(s) for a user to select one or more of the zoom curves/styles to be used for horizon leveling of visual content. As another example, a particular zoom curve/style may be selected for use in generating horizon-leveled visual content based on the rotational positions of the image capture device as a function of progress through the capture duration, the maximum sizes of the viewing window determined as the function of progress through the progress length based on the rotational positions of the image capture device, on the content captured within the visual content (e.g., activity identification, subject identification, face identification, emotion identification), and/or other information. Other selections of zoom curves/styles are contemplated.

In some implementations, the determination of the placement of the viewing window within the field of view of the visual content may include determination of a location of the viewing window within the field of view of the visual content. The location of the viewing window may be determined for different moments within the progress length of the visual content. The location of the viewing window within the field of view of the visual content may determine framing of the visual content. In some implementations, shape, size, and/or other characteristics of the viewing window may be selected to determine the framing of the visual content. The extent of the visual contented defined by the viewing window may define how the portion of the visual content within the viewing window is framed for inclusion in the horizon-leveled visual content.

For example, one or more of location, shape, size, and/or other characteristics of the viewing window may be determined based on content detection and/or other information. Content detection may include detection of one or more things (e.g., persons, faces, objects, environment, emotion, activity, action) depicted within the visual content. One or more of location, shape, size, and/or other characteristics of the viewing window may be determined based on the content detection so that the horizon-leveled visual content includes portions of the visual content framed based on one or more things depicted within the visual content. For example, the shape of the viewing window may be selected as being rectangular or circular and/or to have a particular aspect ratio (e.g., 4:3 aspect ratio, 16:9 aspect ratio, 1:1 aspect ratio) based on user the content captured within the visual content (e.g., detected using activity identification, subject identification, face identification, emotion identification), and/or other information. For instance, a particular aspect ratio may be selected to include depiction of one or more particular things (e.g., a person, an activity) within the viewing window, a particular aspect ratio may be selected to include depiction of one or more particular things (e.g., a face) in a particular manner within the viewing window, and/or a particular aspect ratio may be selected to maximize the extent of the visual content included within the viewing window. In some implementations, the viewing window may be positioned to include one or more particular depictions (e.g., faces, smiles) within the viewing window.

In some implementations, the location of the viewing window may be changed as a function of progress through the progress length to simulate panning in the horizon-leveled visual content. For example, the viewing window may be moved within the field of view of the visual content while not extending beyond the field of view of the visual content. Movement of the viewing window may simulate panning of the image capture device during visual content capture (e.g., panning up and down, side to side). For example, a video may include at different moment depiction of different things of interest in different spatial locations. The location of the viewing window may be changed to pan from one thing of interest to another thing of interest. Other changes in the placement of the viewing window are contemplated.

The generation component 108 may be configured to generate horizon-leveled visual content based on one or more viewing window and/or other information. The horizon-leveled visual content may include a punchout of the extent(s) of the visual content defined by the viewing window(s). Inclusion of the extent(s) of the visual content defined by the viewing window(s) within the horizon-leveled visual content may effectuate horizon leveling of the visual content. Inclusion of the extent(s) of the visual content defined by the viewing windows in video may effectuate horizon leveling of the visual content via selective cropping. The portions of the visual content that are cropped for horizon leveling may depend on the rotational positions of the image capture device during the capture duration and/or other information.

Inclusion of the extent(s) of the visual content defined by the viewing window(s) within the horizon-leveled visual content may result in the horizon-leveled visual content depicting a leveled scene (depiction of a scene that is leveled with respect to ground, sea, earth, and/or the horizon). Inclusion of the extent(s) of the visual content defined by the viewing window(s) within the horizon-leveled visual content may result in the horizon-leveled visual content appearing to have been captured by an upright image capture device (non-tilted image capture device).

Horizon-leveled visual content may be generated to provide a view in which the visual content is leveled (e.g., a horizon depicted within the visual content is leveled, visual content is leveled with respect to horizon). Horizon-leveling may include using smaller portions/extents of the visual content to provide a punchout view of the visual content that creates a more horizon-leveled view than when viewing the entirety of the visual content. Generation of horizon-leveled visual content may include using smaller visual portions of the captured visual content (e.g., smaller visual portions of images/video frames defined by the viewing window) to provide a punchout view of the captured visual content. The horizon-leveled visual content may provide a more horizon-leveled view of the visual content than when the entirety of the visual content is presented.

In some implementations, the visual content may include one or more distortions. A distortion may refer to deviation from rectilinear projection. In rectilinear projection, a straight line within a scene depicted within the visual content may appear as a straight line. A distortion may cause deviation of the visual content from rectilinear projection such that a straight line within a scene depicted within the visual content appears as a curved line. For example, the distortion may include a radial distortion, a barrel distortion, a pincushion distortion, and/or other distortions. The distortion(s) of the visual content may reduce impact of an off-axis horizon depicted within the horizon-leveled visual content. An off-axis horizon may refer to a horizon depicted within the horizon-leveled visual content that deviates from a true horizon (e.g., a straight horizonal line) within the image. The horizon-leveled visual content may include an off-axis horizon based on imperfect horizon leveling of the visual content. For example, the amount of rotation performed on the visual content may be inaccurate and/or imprecise, and the horizon leveling of the visual content may be imperfect.

Figure 7:
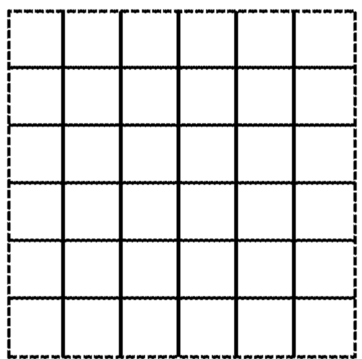
FIG. 7 illustrates example non-distorted and distorted images.
Figure 7:
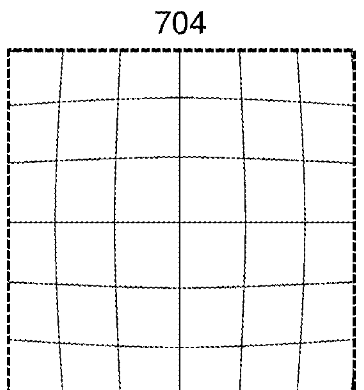
Figure 7:
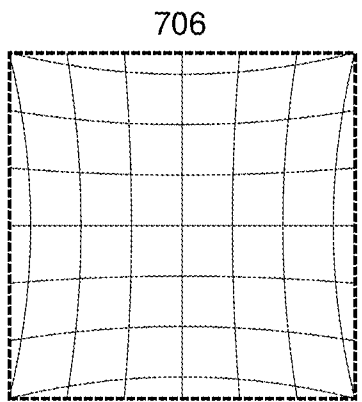

An off-axis horizon may be less noticeable within visual content that includes a distortion than within visual content that does not include the distortion. FIG. 7 illustrates example non-distorted image 702 and distorted images 704, 706. The non-distorted image 702 may include the visual content arranged/captured using a rectilinear projection. The visual content of the non-distorted image 702 may not include a distortion and a straight line within a scene depicted within the visual content may appear as a straight line. In the non-distorted image 702, an off-axis horizon may be quite noticeable.

The distorted image 704, 706 may include visual content arranged/captured using a non-rectilinear projection. For example, the distorted image 704 may include visual content arranged/captured using a barrel distortion and the distorted image 706 may include visual content arranged/captured using a pincushion distortion. In the barrel distortion, image magnification may decrease with distance from the optical axis, simulating an image mapped around a sphere/barrel. In the pincushion distortion, image magnification may increase with distance from the optical axis, causing depictions within the visual content to be bowed inwards, towards the center of the image. Existence of such distortion(s) within an image may create curves within the image, which may make an off-axis horizon less noticeable than in an image without distortion. With respect to the barrel distortion, an off-axis horizon may be bent towards the true horizon and reduce the impact of imperfect horizon leveling. Images with distortion may increase the tolerance for an off axis-horizon, and the images may appear to be level enough with slight offset. Thus, images with distortion may enable use of horizon leveling with less accuracy/precision to produce acceptable results.

In some implementations, the visual content may include a distortion based on capture of the visual content through a wide field of view optical element. For example, the visual content may include a barrel roll distortion based on use of a wide angle lens to capture the visual content. The wide-angle lens may cause the visual content to include the distortion when the visual content is captured.

In some implementations, the visual content may include a distortion based on application of the distortion to non-distorted visual content. Non-distorted visual content may refer to visual content without distortion. For example, non-distorted visual content may be captured through a narrow field of view optical element. The distortion may be applied to the non-distorted visual content based on the visual content including the non-distorted visual content and/or other information. For example, the visual content and/or metadata associated with the visual content may be analyzed to determine existence of and/or type of distortion within the visual content. Based on the visual content not including a distortion (e.g., any distortion, a particular distortion, a barrel distortion), a distortion that reduces the impact of an off-axis horizon depicted within the visual content may be applied to the visual content.

For instance, an image may not include a barrel distortion based on use of a narrow angle lens to capture the image. The image and/or the metadata for the image may be analyzed to determine whether the image contains barrel roll distortion. For example, the image may be analyzed to determine whether the image contains barrel roll distortion and/or the image capture device information/optical element information contained in the metadata may indicate whether the image contains barrel roll distortion. Based on the analysis determining that the image does not include barrel roll distortion, the barrel roll distortion may be applied to the image. As another example, the image and/or the metadata for the image may be analyzed to determine that the distortion within the image does not reduce the impact of an off-axis horizon depicted within the visual content. The distortion within the image may be changed to include a desired distortion that reduces the impact of an off-axis horizon depicted within the visual content (e.g., via a direct transformation that changes the existing distortion to the desired distortion; via an indirect transformation that removes the existing distortion and then applies the desired distortion).

In some implementations, the viewing window(s) used to generate the horizon-level visual content may have a one-by-one aspect ratio. The one-by-one aspect ratio of the viewing window(s) may reduce impact of an off-axis horizon depicted within the horizon-leveled visual content. An off-axis horizon may be less noticeable within a one-by-one aspect ratio presentation of visual content than other aspect ratio presentation of the visual content.

Figure 8:
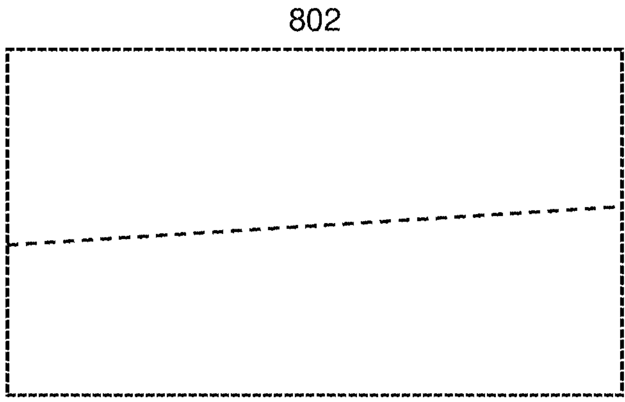
FIG. 8 illustrates example sizes and aspect ratios of viewing windows.
Figure 8:
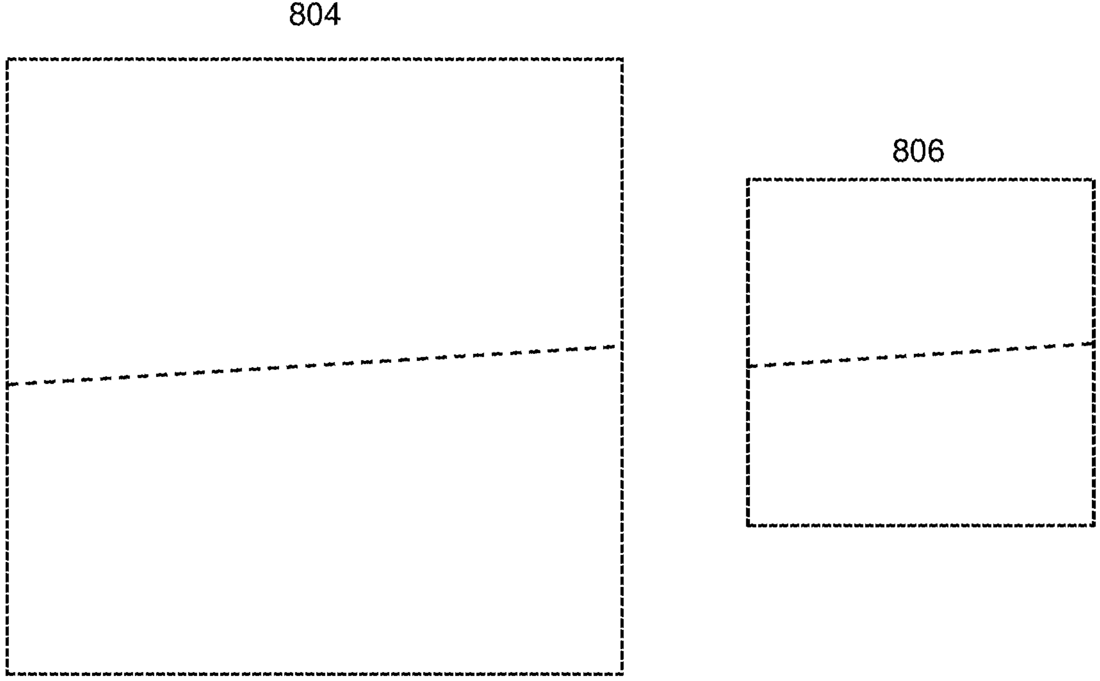

FIG. 8 illustrates example sizes and aspect ratios of viewing windows 802, 804, 806. The viewing window 802 may have a wide aspect ratio (e.g., 16:9). The viewing windows 804, 806 may have a one-by-one aspect ratio (1:1). The viewing window 804 may be larger than the viewing window 806. The width and height of the viewing window 804 may be the same as the width of the viewing window 802. The width and height of the viewing window 806 may be the same as the height of the viewing window 802. An off-axis horizon depicted within the viewing window 802 may be more prominent than off-axis horizons depicted within the viewing windows 804, 806. Wider aspect ratio, such as the aspect ratio of the viewing window 802, may draw attention to the horizon line because the majority of the image is allocated to the width of the image.

In some implementations, the visual content may have a one-by-one aspect ratio. The use of the one-by-one aspect ratio in capturing visual content may enable horizon leveling when the image capture device is rotated by 90 degrees without adversely impacting the overall image composition. In comparison, use of other aspect ratio (e.g., 4:3, 16:9) in capturing visual content may result in change of the image composition between landscape composition and portrait composition when the image capture device is rotated by 90 degrees.

In some implementations, horizon-leveled visual content may be generated as images/video frames including extent(s) of the visual content defined by the viewing window(s). Horizon-leveled visual content may be generated as outputs of portions of the visual captured by the image capture device, with the outputted portions including extent(s) of the visual content defined by the viewing window(s).

In some implementations, the horizon-leveled visual content may be generated as an encoded version/copy of the horizon-leveled visual content (e.g., encoded video file) and/or a director track that defines the extents of the visual content to be used during playback to provide a horizon-leveled view of the visual content. For example, the horizon-leveled visual content may be generated as video frames in a video file, and the video file may be opened in a video player for presentation of the horizon-leveled visual content. The horizon-leveled visual content may be generated as instructions to render the visual content for presentation. The instructions (e.g., director track) may define which visual portions of the visual content (images, video frames) should be included within the presentation of the video content. The instructions may define which visual portions of the visual content should be included during playback to provide a horizon-leveled view of the visual content. The instructions may include information on the location, size, shape, and/or rotation of the punchout of images/video frames to be used to as a function progress through the progress length of the visual content to provide a horizon-leveled view of the images/video frames. A video player may use the instructions to retrieve the relevant visual portions of the images/video frames when the visual content is opened and/or is to be presented.

The generation component 108 may be configured effectuate storage of the horizon-leveled visual content and/or other information in one or more storage media. For example, the horizon-leveled visual content (e.g., video file, director track) may be stored in the electronic storage 13, remote storage locations (storage media located at/accessible through a server), and/or other locations. In some implementations, the generation component 108 may effectuate storage of the horizon-leveled visual content through one or more intermediary devices. For example, the processor 11 may be located within a computing device without a connection to the storage device (e.g., the computing device lacks WiFi/cellular connection to the storage device). The generation component 108 may effectuate storage of the horizon-leveled visual content through another device that has the necessary connection (e.g., the computing device using a WiFi/cellular connection of a paired mobile device, such as a smartphone, tablet, laptop, to store information in one or more storage media). Other storage locations for and storage of the horizon-leveled visual content are contemplated.

In some implementations, the processor 11 may represent multiple processors, and at least one of the processors may be a remote processor located remotely from the housing of the image capture device (e.g., the image capture device 302). One or more of the functionalities of the components 102, 104, 106, 108 may be performed by the image capture device 302 (e.g., by the processor 310) and/or by a remote processor. For example, viewing window determination (functionalities of the viewing window component 106) and/or horizon-leveled visual content generation (functionality of the generation component 108) may be performed by the remote processor during and/or post capture of the visual content by the image capture device. As another example, horizon-leveled visual content generation may be performed by the processor 310 during capture of the visual content to provide the horizon-leveled visual content during capture of the visual content (e.g., preview of visual content being captured presented on a display of the image capture device).

In some implementations, a representation of the viewing window may be presented. For example, an image capture device capturing the visual content may determine the size, location, and/or the rotation of the viewing window during capture of the visual content and may display an outline of the viewing window within a preview of the visual content being captured. Such a presentation may allow a user to have a better understanding of how much of the visual content that is being captured may be horizon level-able (includable in horizon-leveled visual content) and/or to modify use of the image capture device to capture visual content by using the viewing window representation as a guide (e.g., using the outline of the viewing window overlaid over preview of the visual content being captured to frame horizon-leveled visual content).

In some implementations, horizon leveling of the visual content may be performed based on one or more user input. User input may be received through one or more graphical user interfaces and/or one or more user interface devices (e.g., keyboard, mouse, trackpad, button, touchscreen display, microphone). For example, horizon leveling of the visual content may be performed based on a user providing one or more commands through the graphical user interface(s) and/or the user interface device(s) to enable visual content horizontal leveling (e.g., turning on or turning off horizon leveling feature). As another example, horizon leveling of the visual content may be performed based on a user providing one or more commands through the graphical user interface(s) and/or the user interface device(s) to set condition(s) for enabling visual content horizontal leveling and the specified condition(s) being met (e.g., image capture device operation meeting the condition(s) specified by user for turning on or turning off horizon leveling feature).

In some implementations, the visual content may not be horizon leveled in/near real time. For example, the image capture device may not have sufficient resource to apply the horizon leveling technique described herein in real-time and/or may be devoting its resources to other tasks. The horizon leveling of the visual content may be performed by the image capture device once sufficient resource becomes available. The horizon leveling of the visual content may be performed by the remote processor. For example, the remote processor may be one or more processors of a remote computing device (e.g., mobile device, desktop, server), and the remote processor may receive video information and the rotational position information captured/generated by the image capture device. The remote computing device (software running on the remote computing device) may apply the horizon leveling technique described herein post capture of the visual content by the image capture device. The post-capture horizon leveling of the visual content may be performed by the remote processor responsive to reception of the video information and rotational position information, responsive to user/system command to horizon level the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
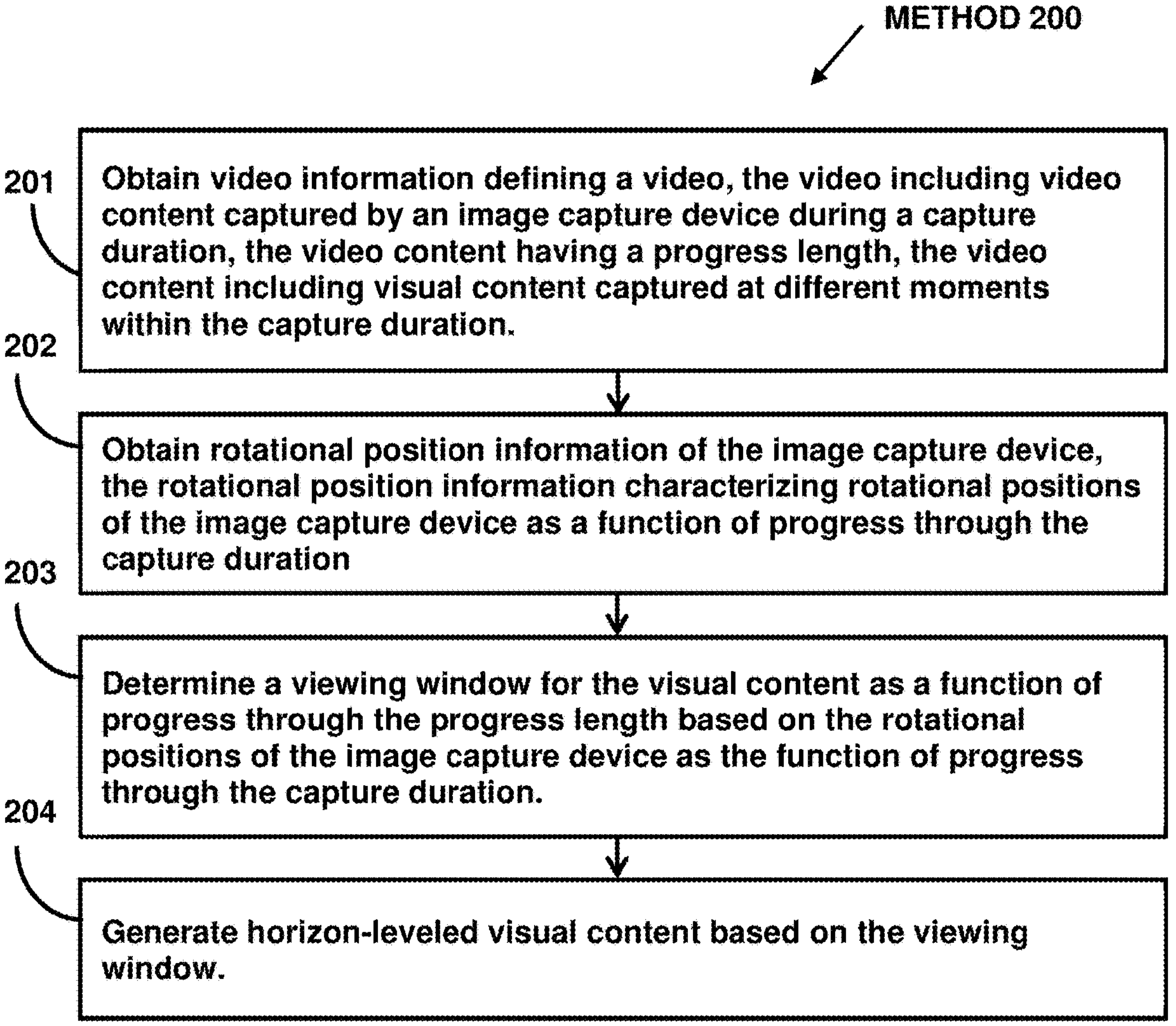
FIG. 2 illustrates an example method for horizon leveling videos.

FIG. 2 illustrates method 200 for horizon leveling videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view. In some implementation, operation 201 may be performed by a processor component the same as or similar to the video information component 102 (Shown in FIG. 1 and described herein).

At operation 202, rotational position information of the image capture device may be obtained. The rotational position information may characterize rotational positions of the image capture device as a function of progress through the capture duration. In some implementation, operation 202 may be performed by a processor component the same as or similar to the position information component 104 (Shown in FIG. 1 and described herein).

At operation 203, a viewing window for the visual content as a function of progress through the progress length may be determined based on the rotational positions of the image capture device as the function of progress through the capture duration and/or other information. The viewing window may define extents of the visual content to be included within horizon-leveled visual content as the function of progress through the progress length. Determination of the viewing window may include determination of a placement of the viewing window within the field of view of the visual content as the function of progress through the progress length based on the rotational positions of the image capture device as the function of progress through the capture duration and/or other information. In some implementation, operation 203 may be performed by a processor component the same as or similar to the viewing window component 106 (Shown in FIG. 1 and described herein).

At operation 204, the horizon-leveled visual content may be generated based on the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content. In some implementation, operation 204 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A camera configured to generate videos which are horizon leveled, the camera comprising:
- an image sensor configured to generate a visual output signal based on light that becomes incident thereon during a capture duration of a video;
- a gyroscope configured to generate rotational position information for the video, the rotational position information characterizing rotation of the camera about a roll axis of the camera as a function of progress through the capture duration;
- one or more physical processors configured by machine-readable instructions to:
  - obtain the visual output signal and generate video information from the visual output signal, wherein the video information defines the video, the video including visual content represented in the visual output signal, the visual content having a progress length, the visual content having a field of view;
  - obtain the rotational position information for the video;
  - determine placement of a viewing window within the field of view of the visual content as a function of progress through the progress length based on the rotation of the camera about the roll axis of the camera as the function of progress through the capture duration, the viewing window defining extents of the visual content to be included within horizon-leveled visual content as the function of progress through the progress length, wherein the placement of the viewing window within the field of view of the visual content compensates for the rotation of the camera about the roll axis of the camera during the capture duration; and
  - generate the horizon-leveled visual content to include the extents of the visual content defined by the viewing window, wherein inclusion of the extents of the visual content defined by the viewing window within the horizon-leveled visual content effectuates horizon leveling of the visual content; and
- a display configured to present the horizon-leveled visual content.

2. The camera of claim 1, wherein the gyroscope is the sole source of the rotational position information.

3. The camera of claim 2, wherein the rotation of the camera about the roll axis of the camera as the function of progress through the capture duration upon which the determination of the placement of the viewing window is based is such rotation as characterized by the rotational position information.

4. The camera of claim 3, wherein the determination of the placement of the viewing window further includes determination of a location of the viewing window within the field of view of the visual content.

5. The camera of claim 4, wherein the placement of the viewing window is determined further based on rotation of the visual content performed by electronic image stabilization.

6. The camera of claim 4, wherein the placement of the viewing window to perform horizon leveling is incorporated with electronic image stabilization.

7. The camera of claim 3, wherein the determination of the placement of the viewing window further includes determination of a size or a shape of the viewing window within the field of view of the visual content.

8. The camera of claim 3, wherein the viewing window has a one-by-one aspect ratio, the one-by-one aspect ratio reducing impact of an off-axis horizon depicted within the horizon-leveled visual content.

9. The camera of claim 3, wherein the visual content includes a distortion such that a straight line within a scene depicted within the visual content appears as a curved line, the distortion of the visual content reducing impact of an off-axis horizon depicted within the horizon-leveled visual content.

10. A method for horizon leveling videos, the method performed by a camera including an image sensor, a gyroscope, one or more processors, and a display, the method comprising:

generating, with the image sensor, a visual output signal based on light that becomes incident thereon during a capture duration of a video;

generating, with the gyroscope, rotational position information for the video, the rotational position information characterizing rotation of the camera about a roll axis of the camera as a function of progress through the capture duration;

obtaining, by the one or more processors, the visual output signal and generating video information from the visual output signal, wherein the video information defines the video, the video including visual content represented in the visual output signal, the visual content having a progress length, the visual content having a field of view;

obtaining, by the one or more processors, the rotational position information for the video;

determining, by the one or more processors, placement of a viewing window within the field of view of the visual content as a function of progress through the progress length based on the rotation of the camera about the roll axis of the camera as the function of progress through the capture duration, the viewing window defining extents of the visual content to be included within horizon-leveled visual content as the function of progress through the progress length, wherein the placement of the viewing window within the field of view of the visual content compensates for the rotation of the camera about the roll axis of the camera during the capture duration;

generating, by the one or more processors, the horizon-leveled visual content to include the extents of the visual content defined by the viewing window, wherein inclusion of the extents of the visual content defined by the viewing window within the horizon-leveled visual content effectuates horizon leveling of the visual content; and displaying the horizon-leveled visual content on the display.

11. The method of claim 10, wherein the gyroscope is the sole source of the rotational position information.

12. The method of claim 11, wherein the rotation of the camera about the roll axis of the camera as the function of progress through the capture duration upon which the determination of the placement of the viewing window is based is such rotation as characterized by the rotational position information.

13. The method of claim 12, wherein determining the placement of the viewing window further includes determining a location of the viewing window within the field of view of the visual content.

14. The method of claim 13, wherein the placement of the viewing window is determined further based on rotation of the visual content performed by electronic image stabilization.

15. The method of claim 13, wherein the placement of the viewing window to perform horizon leveling is incorporated with electronic image stabilization.

16. The method of claim 12, wherein determining the placement of the viewing window further includes determining a size or a shape of the viewing window within the field of view of the visual content.

17. The method of claim 12, wherein the viewing window has a one-by-one aspect ratio, the one-by-one aspect ratio reducing impact of an off-axis horizon depicted within the horizon-leveled visual content.

18. The method of claim 12, wherein the visual content includes a distortion such that a straight line within a scene depicted within the visual content appears as a curved line, the distortion of the visual content reducing impact of an off-axis horizon depicted within the horizon-leveled visual content.

19. A camera configured to generate videos which are horizon leveled, the camera comprising:

an image sensor configured to generate a visual output signal based on light that becomes incident thereon during a capture duration of a video;

a gyroscope configured to generate rotational position information for the video, the rotational position information characterizing rotation of the camera about a roll axis of the camera as a function of progress through the capture duration; and one or more physical processors configured by machine-readable instructions to:

obtain the visual output signal and generate video information from the visual output signal, wherein the video information defines the video, the video including visual content represented in the visual output signal, the visual content having a progress length, the visual content having a field of view;

obtain the rotational position information for the video;

determine placement of a viewing window within the field of view of the visual content as a function of progress through the progress length based on the rotation of the camera about the roll axis of the camera as the function of progress through the capture duration and based on rotation of the visual content performed by electronic image stabilization, the viewing window defining extents of the visual content to be included within horizon-leveled visual content as the function of progress through the progress length, wherein the placement of the viewing window within the field of view of the visual content compensates for the rotation of the camera about the roll axis of the camera during the capture duration; and generate the horizon-leveled visual content to include the extents of the visual content defined by the viewing window, wherein inclusion of the extents of the visual content defined by the viewing window within the horizon-leveled visual content effectuates horizon leveling of the visual content; and a display configured to present the horizon-leveled visual content.

20. The system of claim 19, wherein the determination of the placement of the viewing window includes determination of a size or a shape of the viewing window as the function of progress through the progress length based on the rotation of the camera about the roll axis of the camera as the function of progress through the capture duration.

* * * * *